Feb. 11, 1936.　　　A. H. TOLD　　　2,030,190
RAILROAD SIGNAL
Filed Jan. 19, 1934　　　2 Sheets-Sheet 1
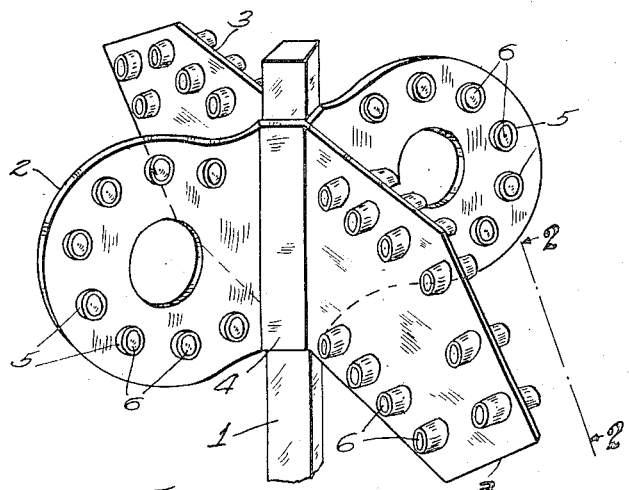
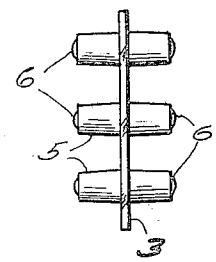
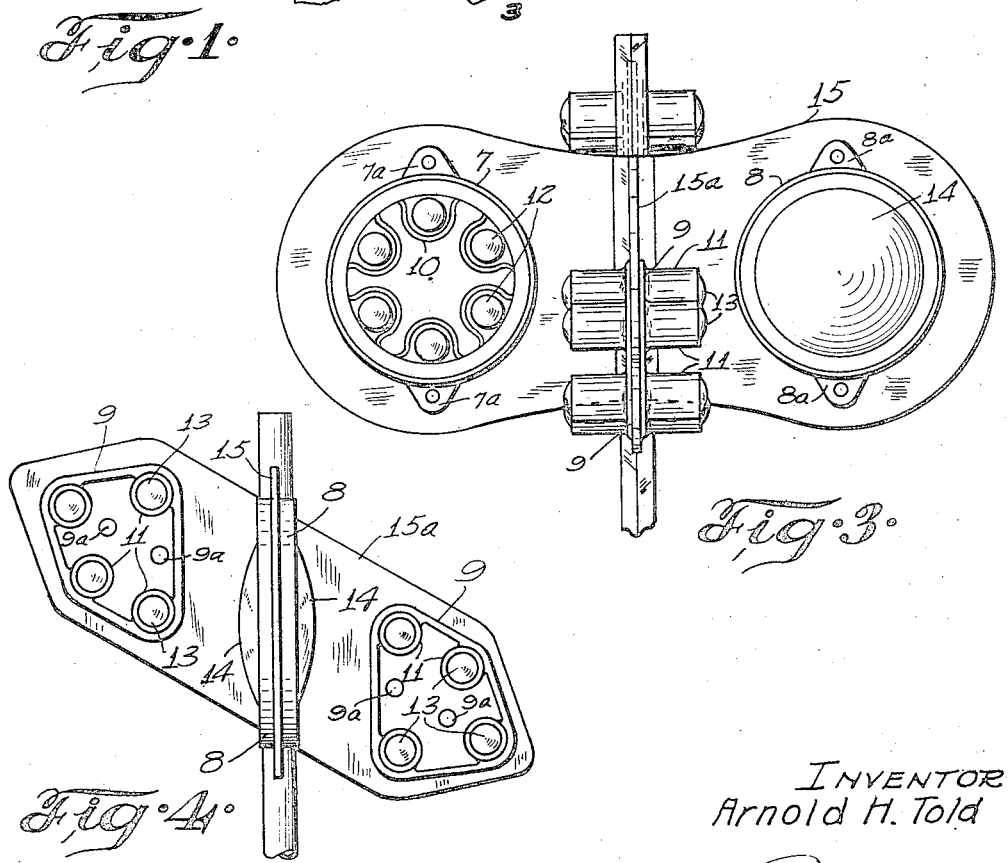
INVENTOR
Arnold H. Told
By Rodney Bedell
ATTORNEY Feb. 11, 1936.         A. H. TOLD              2,030,190
                      RAILROAD SIGNAL
                   Filed Jan. 19, 1934      2 Sheets-Sheet 2
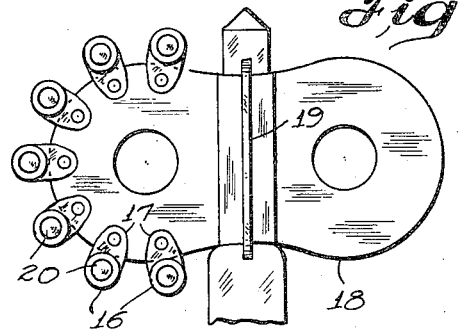
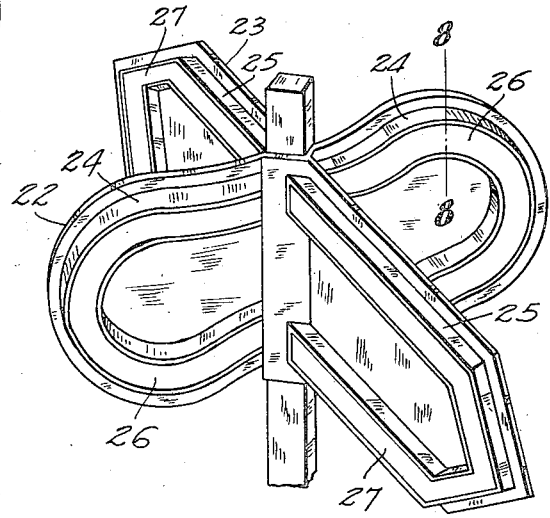
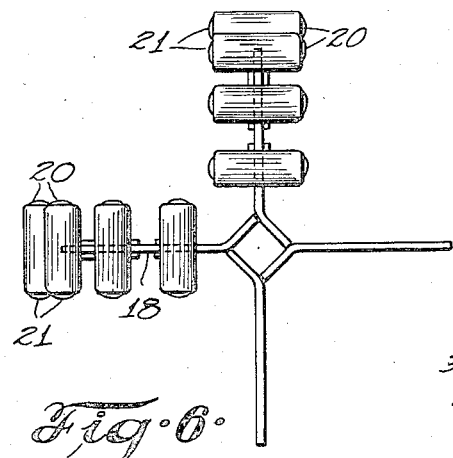
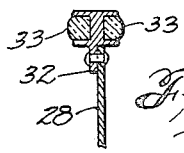
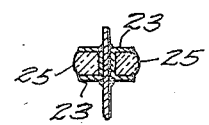
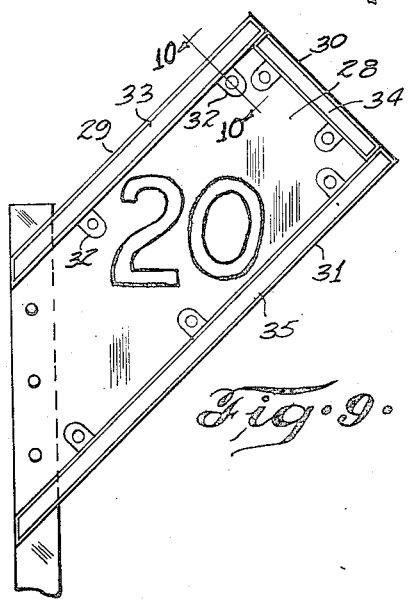
INVENTOR
Arnold H. Told
BY Rodney Bedell
ATTORNEY Patented Feb. 11, 1936

2,030,190

UNITED STATES PATENT OFFICE 2,030,190

RAILROAD SIGNAL

Arnold H. Told, Chicago, Ill., assignor to Chicago Railway Equipment Company, Chicago, Ill., a corporation of Illinois Application January 19, 1934, Serial No. 707,275

6 Claims. (Cl. 40—130)

This invention relates to signs and particularly railroad signals intended for both day and night indication.

Street and highway traffic signs utilizing catadioptric or reflex lenses for imparting information at night have been used advantageously for the purpose of avoiding the expense of supplying fuel or electric current to illuminating lamps, the reflex lenses being disposed, in some instances, in significant shapes or figures to reflect the rays of approaching headlights. However, such signs have been intended primarily for indication at night rather than in daylight when the reflecting lenses are inoperative for practical purposes.

Reflecting lens devices heretofore in use have not been adapted, generally, for application directly to the faces of signboards designed to impart information in daylight.

Railroad signals, and particularly those for indicating switches and derails, usually depend upon the color as well as the shape and position of an arm or blade for imparting the desired information in daylight and for this reason the indicating faces of such signals have not been equipped with reflecting lenses.

Switch stands now in use are provided at the top with lamps secured in place by a set screw which can be easily removed, permitting removal of the lamp. Also cases have been known in which the lamps have been turned so as to give the wrong information with serious results.

An important object of the present invention is to provide a light reflecting device which may be applied conveniently and advantageously directly to the faces of railroad signal blades and signboards without unduly obstructing the view thereof in daylight.

Another object is to provide a railroad signal in which a plurality of differently colored and/or arranged reflex elements are carried on one or more boards so as to be moved therewith into different operative positions to impart desired information at night by reflecting the rays of approaching headlights, both the day and night indicating means being inoperative for practical purposes when out of said positions.

These objects and others are attained by the structures illustrated in the accompanying drawings in which—

Figure 1 is a perspective view of a railroad switch signal showing one form of the invention applied thereto.

Figure 2 is another view of the same showing an edge of one of the indicating blades or boards and taken substantially on the line 2—2 of Figure 1.

Figure 3 is a side view of a similar signal with another form of invention applied thereto.

Figure 4 is a view of the device in Figure 3 and taken at 90° thereto.

Figure 5 is a view of a switch signal illustrating another form of the invention.

Figure 6 is a top view of the structure in Figure 5.

Figure 7 is a perspective view of a switch signal illustrating another form of the invention.

Figure 8 is a detail cross section taken on the line 8—8 of Figure 7.

Figure 9 illustrates a railroad right-of-way sign embodying a modification of the invention as shown in Figure 7.

Figure 10 is a detail section on the line 10—10 of Figure 9.

In Figures 1 and 2 is illustrated the upper portion of a low or dwarf railroad signal such as is commonly located directly in the path of light rays from the headlights of approaching locomotives and used to indicate the position of a switch or derail. The staff 1 is mounted at the bottom upon suitable rotational mechanism (not shown) which is controlled by the associated switch or derail. Near the top of the staff are mounted at 90° to each other the arms or blades 2 and 3 shown in the present instance as formed rigid with a central bracket portion 4 which is secured to the staff 1. The blade 2 is disposed horizontally and may be conveniently colored red to indicate an open switch or closed derail, and the blade 3 is inclined at approximately 45° and may be conveniently colored yellow to impart the well known caution or proceed signal. It will be understood that rotation of the staff 1 by means of the switch or derail controlled mechanism referred to will cause the blades 2 and 3 to be moved selectively to operative positions facing approaching traffic, and practically invisible and inoperative positions paralleling the line of traffic.

Mounted on each of the blades 2 and 3 are a series of lens casings or housings 5 which preferably, though not necessarily, project from both sides of each blade as shown and these casings receive the reflecting lenses 6. It will be observed therefore that the lenses 6 on each blade are disposed to impart information in the same directions as the indicating faces of the blade by reflecting the rays of headlights of approaching traffic at night. The lens mountings substantially outline the blades and the lenses may be colored to correspond with the respective blades whereby both the shaping and coloring of the night signal and the daylight signal will be the same. The casings 5 may be secured to the signal blades by welding or, if desired, small bolting flanges or lugs may be provided thereon. The lens mountings are of small shape and are substantially spaced apart so as not to unduly obstruct the view of the colored blades in the daytime.

In Figures 3 and 4, the reflecting lenses are mounted upon base plates 7, 8 and 9, which correspond in external contour with the shaping of the mounting portions of the respective blades 15 and 15a. The opposing base plates 9 at each end of blade 15a are secured together and to the blade by rivets 9a. The base plates 7 and 8 are provided with attaching lugs 7a and 8a. Projecting from the base plates 7 and 9 are groups of lens housings or casings 10 and 11 mounting the reflecting lenses 12 and 13. The base plate 8 is provided with a single reflecting lens 14. It will be understood that the lens arrangements on each blade preferably will be similar, the different lenses 12 and 14 being shown as applied to the horizontal blade 15 for illustrative purposes. Preferably the base plates 7, 8 and 9 will be colored the same as the corresponding signal blades, as will the lenses 12, 13 and 14, so that day indication will not be obstructed and the indication at night will be the same as that in daylight in both position and color of parts. In practice, the lens mountings 10 and 11 may project laterally from the respective blades a substantially less distance than shown in Figure 3.

In Figures 5 and 6, the lens mountings 16 are provided with small lateral flanges 17 for attachment to the edges of the signal blades 18 and 19. The mountings 16 extend on both sides of the supporting blades and receive the oppositely facing reflecting lenses 20 and 21. This type of lens mounting if disposed around the edge of the blade as shown, will clearly indicate the shape thereof at night. Moreover, the visibility of the indicating face of the blade in daylight is not materially affected by the lens mountings.

In Figure 7, the blades 22 and 23 are equipped with lens casings 24 and 25 for mounting the elongated narrow lenses 26 and 27 extending continuously around the respective blades adjacent the edges thereof. The lens mountings may be conveniently welded to the faces of the blades and in practice may be substantially smaller than is shown in the drawings relative to the size of the blade in order to cover as little of the face of the blade as possible. This type of lens mounting may also be attached to the edge of the blade in order to leave the entire face unobstructed, or may extend in a single strip through the center of the blade.

In Figure 9 is shown a railroad signboard 28 inclined approximately 45° to the horizontal and having a series of lens casings 29, 30 and 31 secured to the edges thereof by means of lugs 32. The casings mount reflecting lenses 33, 34 and 35 forming substantially continuous lines around the margins of both faces of the sign. The lenses thus are disposed to clearly indicate in opposite directions both the shape and angular disposition of the signboard at night. The lenses and lens mountings in this form offer no obstruction to the view of the signboard in the daylight. The sign shown is commonly used to indicate a restricted speed track section and the speed designating numeral may also be marked with reflex lenses.

The various forms of the invention illustrate practical means of applying reflecting lenses to railway signals and particularly switch and derail signals without the necessity of providing a separate part of the signal for mounting the lenses and at the same time without unduly obstructing the view of the signal blade. Thus the signals are more compact and durable and are less expensive than the lamp signals heretofore in use. Moreover, the novel signal is adapted to impart desired information by arrangement and disposition of parts as well as by color and, accordingly has advantages over lamp signals which impart information at night merely by colors. Arrangement of the reflex buttons to indicate the angular disposition of the signboard has the advantage that the observer will be able to distinguish the signal even though he may be color blind since it is well known among railroad employes that a horizontal position means danger or stop, a diagonal position means caution, and a vertical position means clear.

A further advantage of the novel signal is that the lens mountings can be conveniently welded or riveted to the signboard which, in turn, may be similarly secured to the staff. Thus considerable difficulty would be experienced in removing the lenses, which would necessitate breaking the glasses or distorting the sign blades so that an approaching engine driver can detect the tampering or damage.

Obviously the invention is not limited to the exact details of the structures illustrated but may be modified in various respects as will occur to those skilled in the art to which the invention pertains and the exclusive use of all such modifications as come within the scope of the appended claims is contemplated.

What is claimed is:

1. In combination, a signal plate with opposite surfaces for imparting information in the daylight in different directions, a series of relatively small casings located immediately beyond an edge of said plate and clear thereof and each having a lug supporting said casing from said plate, and a plurality of reflex lenses in each of said casings facing in said directions for imparting information at night by reflecting rays from headlights of traffic approaching from said different directions.

2. A device for application to differently shaped signal plates comprising a relatively small casing with a lens opening, and a supporting lug projecting laterally from said casing for attachment to the plate, said device being adapted to be applied with one or more similar devices to an edge of a signal plate to indicate the shape and extent of said edge at night.

3. In combination, a signal plate, and indicating means therefor comprising a series of relatively small casings disposed in spaced relation along an edge of said plate and beyond the same, each of said casings mounting a reflecting lens and having a restricted lug attached to said plate, whereby said means indicates the shape of said plate, said means being applicable to signal plates of different sizes and shapes by varying the number and relative disposition of said casings.

4. A compact indicator device for application to a signal plate irrespective of the thickness of the material therein comprising a casing adapted to be disposed transversely of the plate and secured thereto and having oppositely facing openings, and lenses in said openings for indication on both sides of the plate at night.

5. A signal comprising a plate member, and a plurality of devices as specified in claim 4 applied adjacent the edges of said plate member, and indicating substantially the shape and extent of said edges.

6. In a signal, support structure, a plate carried thereby and having oppositely facing indicating faces, and a relatively small device mounted directly on the body of said plate independently of said structure and comprising a casing extending through said plate and lens elements in said casing facing in opposite directions.

ARNOLD H. TOLD.